United States Patent [19]

Otowa et al.

[11] Patent Number: 5,067,468
[45] Date of Patent: Nov. 26, 1991

[54] APPARATUS FOR PREVENTING DISCHARGE OF FUEL VAPOR

[75] Inventors: Hidekazu Otowa; Kazuhiro Okada; Hidefumi Sonoda; Tadao Kaneko, all of Aichi, Japan

[73] Assignee: Toyota Jidosha Kabushiki Kaisha, Toyota, Japan

[21] Appl. No.: 502,278

[22] Filed: Apr. 2, 1990

[30] Foreign Application Priority Data

Apr. 3, 1989 [JP] Japan .................. 1-39362[U]

[51] Int. Cl.⁵ .................................... F02M 37/04
[52] U.S. Cl. .................................. 123/516; 123/520
[58] Field of Search ............ 123/516, 509, 518, 519, 123/520, 521

[56] References Cited

U.S. PATENT DOCUMENTS

| | | | |
|---|---|---|---|
| 3,957,025 | 5/1976 | Heath | 123/518 |
| 4,659,346 | 4/1987 | Uranishi | 123/519 |
| 4,790,283 | 12/1988 | Uranishi | 123/516 |
| 4,815,436 | 3/1989 | Sasaki | 123/520 |
| 4,817,576 | 4/1989 | Abe | 123/518 |
| 4,819,607 | 4/1989 | Aubel | 123/518 |
| 4,860,715 | 8/1989 | Hiraku | 123/516 |
| 4,872,439 | 10/1989 | Sonoda | 123/516 |
| 4,887,578 | 12/1989 | Woodcock | 123/516 |

FOREIGN PATENT DOCUMENTS

| | | | |
|---|---|---|---|
| 0164763 | 12/1980 | Japan | 123/518 |
| 63-41244 | 2/1988 | Japan | |
| 63-121757 | 8/1988 | Japan | |

Primary Examiner—Carl Stuart Miller
Attorney, Agent, or Firm—Finnegan, Henderson, Farabow, Garrett and Dunner

[57] ABSTRACT

An apparatus for preventing discharge of fuel vapor to the atmosphere by allowing fuel vapor in a fuel tank to be adsorbed by an adsorbing device when a fuel lid is opened. A switch is secured to a mounting bracket for rotatably supporting a fuel lid opener lever mounted in a vehicle compartment. The switch is turned on by the operation of the remote lever that opens the fuel lid, and fuel vapor is adsorbed by charcoal in a canister. The switch is adjustably secured to the mounting bracket, to facilitate positioning the pushbutton of the switch relative to the lid opening lever.

13 Claims, 7 Drawing Sheets

APPARATUS FOR PREVENTING DISCHARGE OF FUEL VAPOR

BACKGROUND OF THE INVENTION

1. Field of the Invention

The present invention relates to an apparatus for preventing discharge of fuel vapor; and more particularly, to an apparatus for preventing such discharge from a vehicle fuel tank which is made to communicate with a charcoal canister via a vent tube at times when a fuel lid is opened by a fuel lid opener, for causing fuel vapor to be adsorbed by the charcoal canister.

2. Description of the Related Art

A conventional for preventing discharge of fuel vapor from a vehicle fuel tank to the atmosphere when the fuel tank is being filled is apparatus disclosed in Japanese Patent Laid-Open No. 41244/1988.

This apparatus has a vent tube connecting the fuel tank to a charcoal canister for adsorbing fuel vapor. A solenoid valve which is disposed midway in the vent tube is normally closed when the fuel lid is closed (locked state). A switch detects the actuation of the fuel lid opener and opens the solenoid valve.

Accordingly, at the time of refueling, if the locked fuel lid is operated to the unlocked state by operating a lid opener lever, the actuation detecting switch is turned on, which, in turn, causes the solenoid valve in the vent tube to open, thereby allowing fuel vapor in the fuel tank to flow into charcoal canister via the vent tube for adsorption by the charcoal in the canister. As a result, it is possible to prevent the fuel vapor from being discharged via the inlet pipe (filler pipe) to the atmosphere during refueling.

This prior apparatus for preventing discharge of fuel vapor, uses an actuation detecting switch as shown in FIG. 7, wherein, an actuation detecting switch 90 is disposed midway in a wire tube 92 covering a wire 94, which connects the lid opener lever to a fuel lid locking device. The opening and closing of actuation detecting switch 90 is controlled by an actuator 96 fixed to the movable wire 94.

Accordingly, after a fuel lid locking device is mounted to an automobile body, it is necessary to adjust the position of the wire tube 92 relative to the wire 94 so as to detertmine the relative position of the actuation detecting switch 90 and the actuator 96. This position complicates the adjusting operation, and decreases the operating efficiency of assembly. In addition, even the fixing of a magnet to the wire and a lead switch to the wire tube does not make the adjusting operation any less complicated than the one described above.

SUMMARY OF THE INVENTION

Accordingly, an object of the present invention is to provide an apparatus for preventing discharge of fuel vapor which overcomes the above described deficiencies by decreasing the difficulty of adjusting the position of an actuation detecting switch for detecting the opening of a fuel lid.

To attain the above-described object, and in accordance with one aspect of the invention, there is provided an apparatus for preventing discharge of fuel vapor from a fuel tank comprising: adsorbing means for adsorbing fuel vapor; means for communication between the adsorbing means and the fuel tank; control means including mounting means for mounting the control means in a vehicle compartment for opening a fuel lid through remote control; switching means secured to the control means and responsive to the operation of the control means for opening the fuel lid; and valve means for closing the communicating means in response to the closing of the fuel lid and for opening the communicating means in response to the operation of the switching means.

In accordance with the invention, if the fuel lid is opened by operating the control means through remote control, the switching means, which is secured to the remote control means is actuated. In interlocking relationship with the actuation of the switching means, the communicating means is opened, thereby allowing the adsorbing means to communicate with the interior of the fuel tank. Accordingly, fuel vapor inside the fuel tank flows toward the adsorbing means via the communicating means and is adsorbed thereby.

As described above, in accordance with the present invention, since the switching means is secured to the remote control means, it is possible to adjust the position of the switching means before the control means are mounted in the vehicle. Accordingly, it is advantageous that the efficiency in adjusting the position thereof during assembly is improved.

Additional objects and advantages of the invention will be set forth in part and in part will be obvious from the description, or may be learned by practice of the invention. The objects and advantages of the invention may be realized and attained by means of the instrumentation and combination particularly pointed out in the appended claims.

BRIEF DESCRIPTION OF THE DRAWINGS

The accompanying drawings, which are incorporated herein and constitute a part of this specification illustrate one embodiment of the present invention, and together with the description serve to explain the principles of the present invention.

DESCRIPTION OF THE PREFERRED EMBODIMENT

Referring now to FIGS. 1-6, a description will be given of an embodiment of the present invention. As used herein, unless otherwise stated, the terms "longitudinal" and "longitudinally" refer to the longitudinal direction of the vehicle, and the terms "transverse" and "transversely" refer to the transverse direction of the vehicle.

Figure 3:
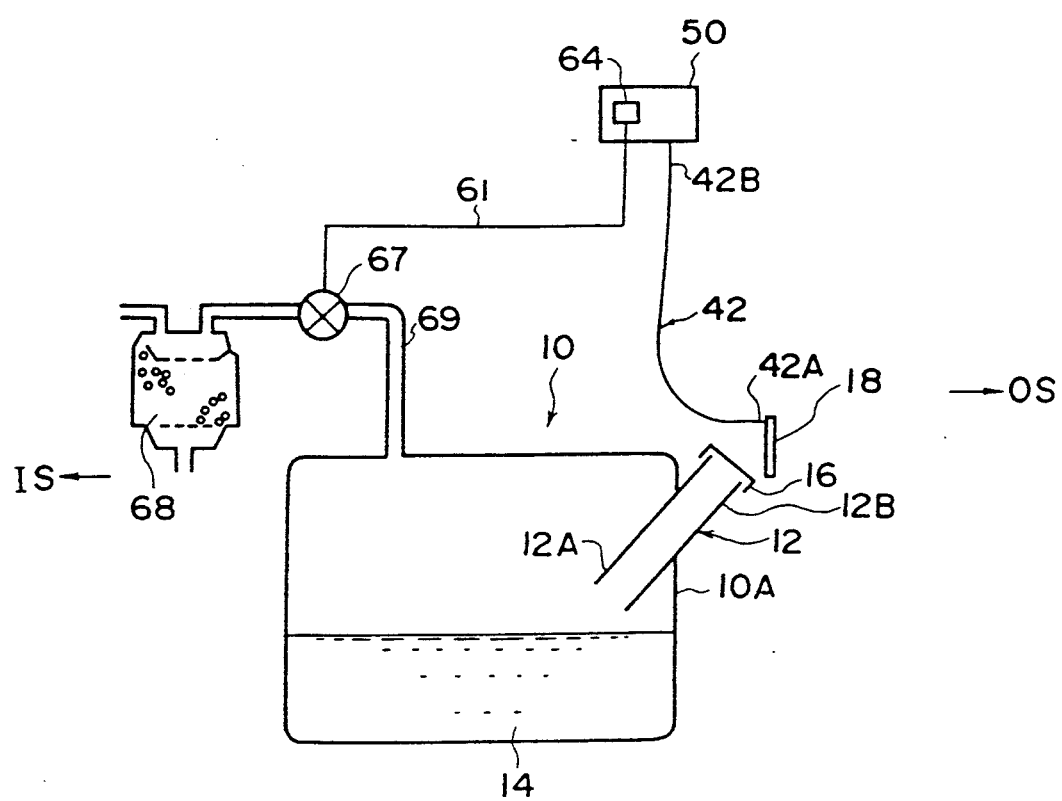
FIG. 3 is a diagram schematically illustrating a system including apparatus for preventing discharge of fuel vapor utilizing the apparatus of the present invention.

As shown in FIG. 3, a lower end 12A of an inlet pipe (i.e., a filler pipe) 12 passes through an outer wall 10A, as viewed in a transverse direction, (on the right-hand side in FIG. 3) of a fuel tank 10 mounted on the vehicle. Fuel 14 is contained in the fuel tank 10.

Figure 4:
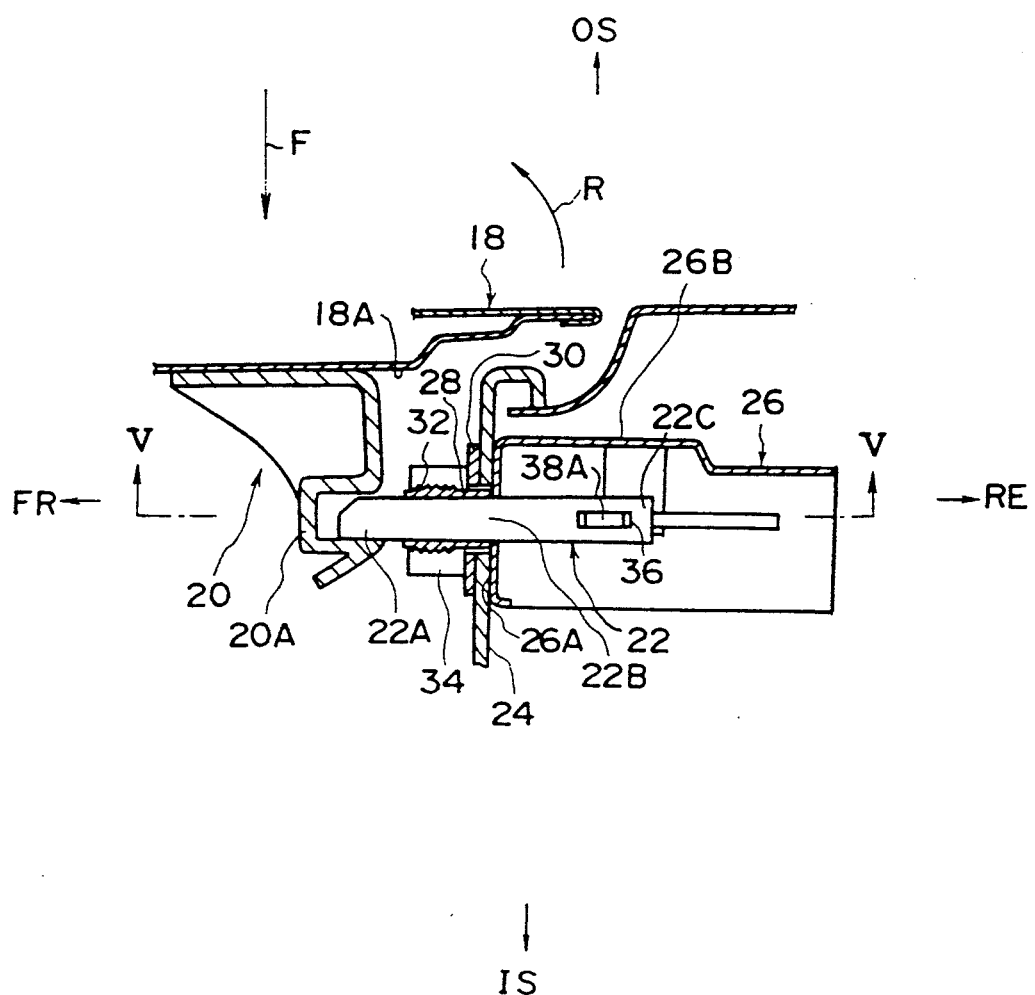
FIG. 4 is a horizontal cross-sectional view of a fuel lid portion of the apparatus for preventing discharge of fuel vapor in accordance with the present invention.

An upper end of the inlet pipe 12 serves as a fuel inlet port 12B on which a fuel cap 16 is threadingly engaged. A fuel lid 18 is attached to a portion of a vehicle body outwardly of the fuel cap 16, as viewed in the transverse direction. The fuel lid 18 is pivotally supported by the vehicle body; and is constantly urged by an urging means (not shown) counterclockwise as shown in the direction of arrow R of FIG. 4 i.e., in the direction in which it is opened. After fuel lid 18 is opened, if the fuel cap 16 is removed from the fuel inlet port 12, and a fuel nozzle is inserted into the fuel inlet port 12B, fuel 14 can be supplied to the fuel tank 10. In FIG. 4, arrow F indicates the direction in which the fuel nozzle is inserted.

As shown in FIG. 4, a lid locking means includes a retainer 20 for holding the fuel lid 18 in a closed state, which is secured to an inner side surface of the fuel lid 18, as viewed in the transverse direction by means of a bolt (not shown) welded to the fuel lid in such a manner as to extend through the fuel lid 18 in the transverse direction A nut (not shown) is threated on the bolt.

A substantially U-shaped recess defined by a bent hook portion 20A is formed in a transversely extending inner side of the lid retainer 20 with its open end facing rearwardly of the vehicle (the right as viewed in FIG. 4). In the locked state, one end 22A of a shaft 22 of the lid locking means is inserted into the recess defined by hook portion 20A from the longitudinal rear.

Figure 5:
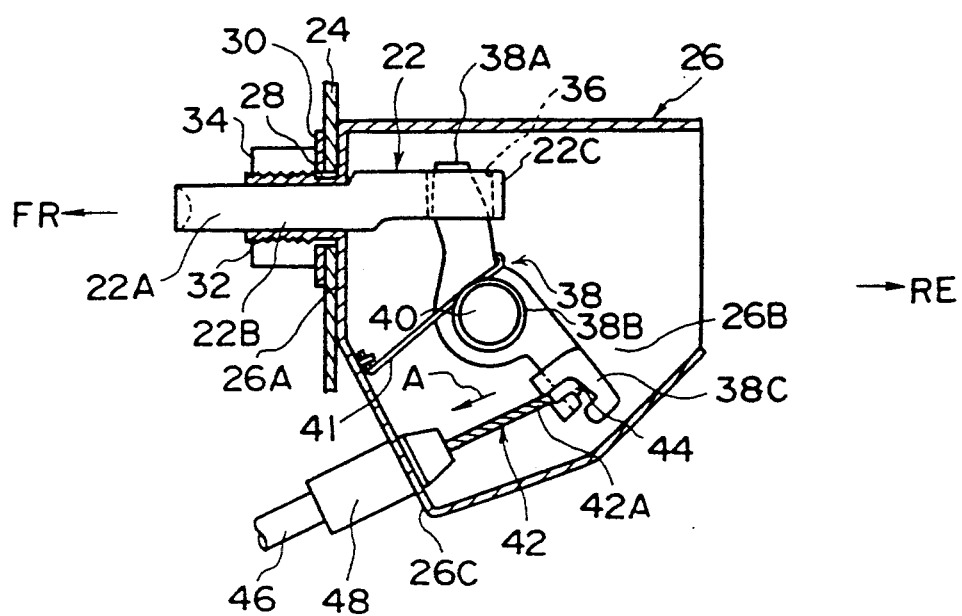
FIG. 5 is a cross-sectional view taken along the line V—V of FIG. 4.

As shown in FIGS. 4 and 5, the shaft 22 is secured by a shaft retainer or support housing 26, i.e., a support housing for the lid locking means in such a manner as to be movable in the longitudinal direction. Specifically, a central portion 22b of the shaft 22 is held in such a manner as to be inserted axially through a cylindrical member or bushing 28. The cylindrical bushing 28 extends longitudinally from front 26A of the shaft support housing 26 and projects perpendicular to the side 26A toward the front of the vehicle. Thus, the shaft 22 is movable axially in the longitudinal direction in cylindrical bushing 28.

Housing 26 is fastened to a vehicle frame member 24 with bushing 28 extending in a longitudinal direction through frame 24 of the vehicle body. A washer 30 is fitted over the cylindrical portion 28 from the front and abuts the frame 24. An external thread 32 is formed on the cylindrical portion 28 forward of frame 24, and a nut 34 inserted from the longitudinally front is threaded on the external threads 32. In other words, the washer 30 and frame 24 are clamped between the nut 34 and the shaft housing 26, thus securing shaft housing 26 to the frame 24.

A rectangular through hole 36 extends vertically through shaft 22 adjacent the rear end portion 22C of the shaft 22 in such a manner as to extend in the vertical direction of the vehicle (in the direction perpendicular to the plane of the drawing of FIG. 4), lid opening control means is provided for remotely controlling the operation of the lid locking means in interlocking relationships with the switching means. As embodied herein, lid opening control means includes a lever 38, one end 38A extending into hole 36 from beneath the shaft.

As shown in FIG. 5, a central portion 38B of the lever 38 is pivotally supported on a supporting pin 40 which is mounted on an outer vertical wall 26B of support housing 26 and extends from the vertical surface 26B transversely inwardly of housing 26. Consequently, the lever 38 is rotatable about the supporting pin 40 clockwise or counterclockwise as view in FIG. 5. In addition, the lever 38 is constantly urged counter clockwise as viewed in FIG. 5 by a torsion coil spring 41.

Thus, as lever 38 moves in either a clockwise or counter clockwise direction, the shaft 22 moves axially with it.

A hook portion 38C is formed at a lower end of the lever 38. A hook 44 fixed to one end 42A of a wire 42 is retained by the hook portion 38C. The wire 42 is inserted in a wire tube 46, and one end 46A of the wire tube 46 is secured to a lower wall 26C of the shaft housing 26 via a tube stopper 48. As shown in FIG. 3, other end 42B of the wire 42 is connected to a lid opener 50, which is the remote portion of the lid opening control means, and is provided, for example, in a vehicle compartment, such as a glove compartment.

Accordingly, if the lid opener 50 is operated to pull the wire 42 in the direction of arrow A of FIG. 5 against the urging force of the torsion coil spring 41, the lever 38 rotates about the support pin 40 clockwise as viewed in FIG. 5.

Figure 1:
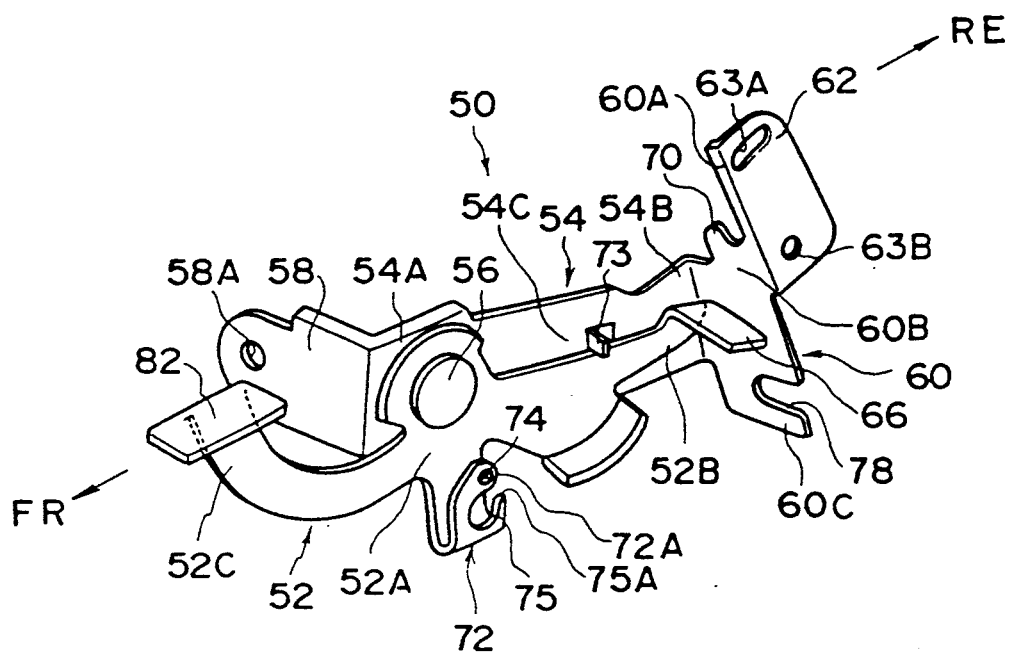
FIG. 1 is a fragmentary perspective view of a fuel lid opener lever and mounting base plate to which an opener switch is mounted for preventing discharge of fuel vapor in accordance with the present invention.
Figure 2:
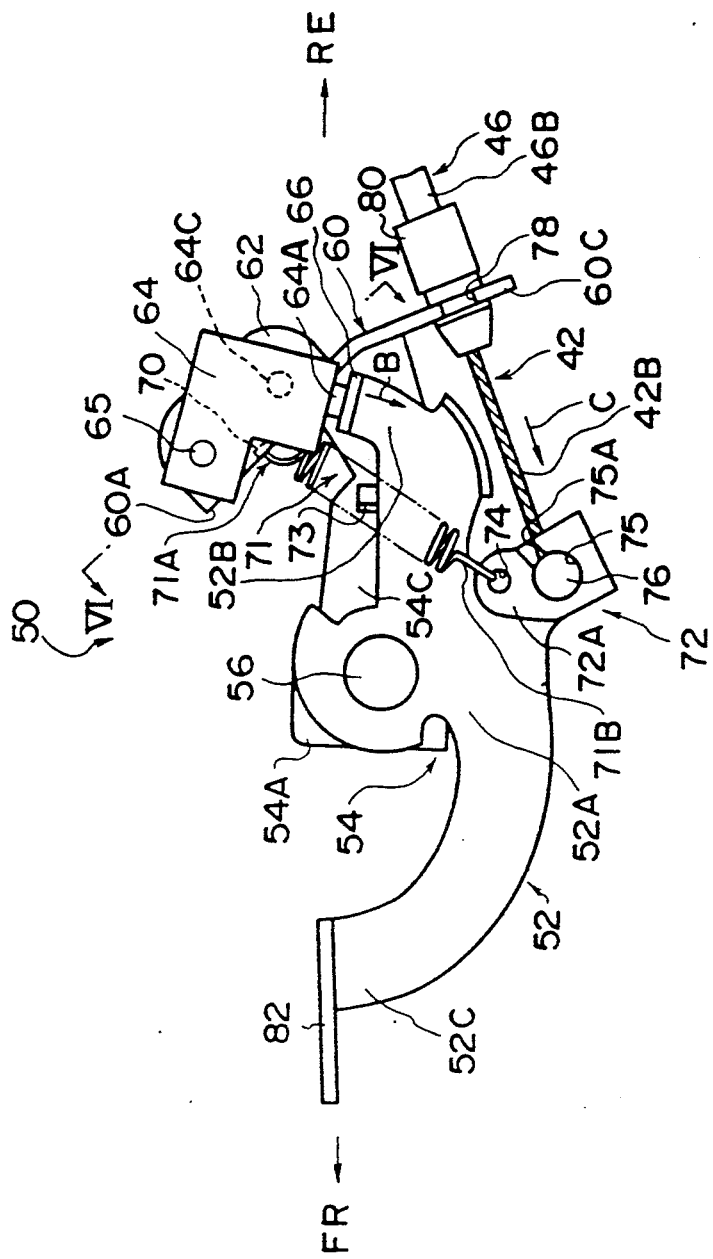
FIG. 2 is a side elevational view showing the fuel lid opener lever and base plate with an opener switch in accordance with the present invention.

As shown in FIGS. 1 and 2, remote lid opener portion 50 of the control means mainly comprises a lid opener lever 52 and a mounting means such as a base plate 54.

The base plate 54 is formed of a tabular member, and its longitudinally extending front end portion (a left-hand end portion in FIG. 2 54A is provided with a supporting pin 56 projecting transversely. A central portion 52A of the lid opener lever 52 is pivotally supported by the supporting pin 56 so that the lid opener lever 52 is rotatable about the supporting pin 56 clockwise or counterclockwise as viewed in FIG. 2.

In addition, a front end of the longitudinal front end portion 54A of the base plate 54 is bent orthogonally in a direction into the plane of the drawing of FIG. 2 so as to constitute a flange 58 (see FIG. 1). The flange 58 is provided with a circular hole 58A, and a bolt (not shown) is inserted in the circular hole 58A. For securing the base plate 54 fixedly inside the vehicle compartment.

Meanwhile, an end of transverse rear end portion (a right-hand end portion in FIG. 2) of the base plate 54 is bent orthogonally out of the plane of the paper of FIG. 2 so as to constitute a bent portion 60. An outer end of an upwardly extended portion 60A of the bent portion 60 extends transversely relative bent portion 60 in a longitudinal direction rearwardly to constitute a mounting portion 62. The mounting portion 62 is provided with an arcuate elongated hole 63A and a circular hole 63B.

Figure 6:
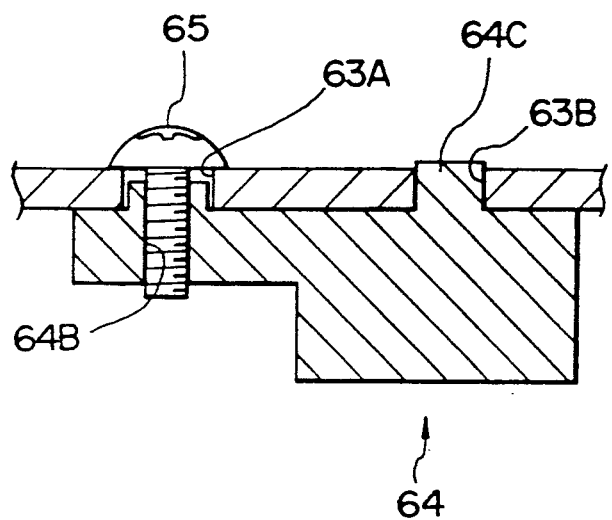
FIG. 6 is an enlarged fragmentary cross-sectional view taken along the line VI—VI of FIG. 2.
Figure 7:
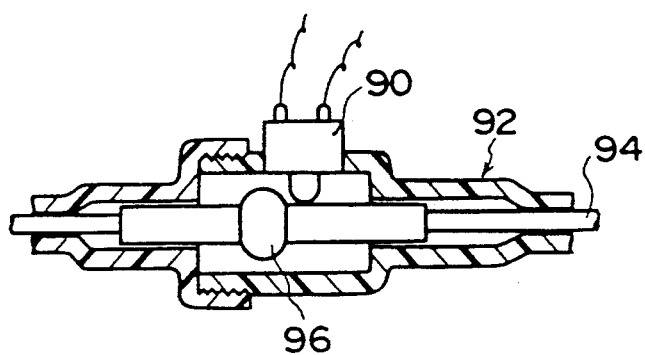
FIG. 7 is a side cross-sectional view of a conventional actuation detecting switch.

As shown in FIG. 6, a screw 65 extends through the elongated hole 63, and threadingly engages internally threaded hole 64B formed in an opener switch 64 serving as the actuation detecting switch for the remote control means. A projection 64C formed on the opener switch 64 is fitted in the circular hole 63B. Thus, switch 64 can be pivotally adjusted by an amount that is limited by the length of slot 63A. Accordingly, the mounting position of the opener switch 64 is adjustable by loosening the screw 65 positioning the switch relative elongated slot 63A, and tightening the screw 65.

A pushbutton 64A projects from the lower side of the opener switch 64 as viewed in FIG. 2 and is depressible upwardly. The pushbutton 64A is constantly urged downwardly in the direction of arrow B as viewed in FIG. 2 by an urging means provided in the opener switch 64, so that the opener switch 64 closes (turn on) when the pushbutton 64A is permitted to moved downwardly by the urging force.

Opener switch 64 may be any conventional switch having a depressible pushbutton that is open when it is in its depressed state and closed when in its extended state. The inner details of such switch form no part of the present invention.

A pressing portion 66 formed on a longitudinally extending rear end portion 52B of the lid opener lever 52 abuts the downwardly extending end of the pushbutton 64A of the opener switch 64. This pressing portion 66 is bent substantially perpendicular to the plane of the surface of 51 from the upper end of the end 52B of the lid opener lever 52 toward the transversely outer side thereof (see FIG. 1). Hence, the pressing portion 66 moves in the direction of arrow B when the lid opener lever 52 rotates clockwise as viewed in FIG. 2 to a closed condition.

As shown in FIG. 3, the opener switch 64 is connected to a coil of a solenoid valve 67 via an electrical wire 61. The solenoid valve 67 is provided midway in a vent tube 69 connecting the fuel tank 10 and a charcoal canister 68. The arrangement is such that when the opener switch 64 is open, the vent tube 69 is shut off, and when the opener switch 64 is closed, the coil is excited by an unillustrated battery, and the vent tube 69 is opened, thereby establishing a communicating state.

As shown in FIG. 1, a hook 70 is formed at the upper extended portion 60A of the bent portion 60 of the base plate 54 in such a manner as to extend in the upper direction of the vehicle. As shown in FIG. 2, one hook 71A of a tension coil spring 71 is retained by the hook 70. The other hook 71B of the tension coil spring 71 is retained at a circular hole 74 provided in a distal end 72A of a curved portion 72 which is formed in such a manner as to extend downwardly from the central portion 52A of the lid opener lever 52 and bend in a U-shaped configuration.

Consequently, the lid opener lever 52 is constantly urged counterclockwise in FIG. 2 by the tension of coil spring 71.

A pawl 73 is provided on a longitudinal central portion 54C of the base plate 54 in such a manner as to project transversely out of the plane of the paper of FIG. 2, and a portion adjacent to an end 52B of the lid opener lever 52 abuts the pawl 73 from therebelow. Accordingly, the counterclockwise rotation, as viewed in FIG. 2, of the lid opener lever 52 is prevented by the pawl 73. As a result, it is possible to prevent the opener switch 64 from becoming damaged by an unnecessary load acting on the opener switch 64 via the pushbutton 64A due to the urging force of the tension coil spring 71.

A circular hole 75 with a notch 75A formed on the longitudinal front side thereof is provided on the lower side of the circular hole 74 in the lid opener lever 52. A cylindrical stopper 76 secured to one end 42B of the wire 42 is retained in the circular hole 75.

The other end 46B of the wire tube 46 is secured via a tube stopper 80 at a U-shaped notch 78 which is formed in a lower projection 60B of the bent portion 60 of the base plate 54 to open outwardly.

A longitudinal front end 52C of the lid opener lever 52 is bent horizontally toward the transversely outer side so as to constitute a handle 82.

Accordingly, as an occupant pulls this handle 82 upwardly against the urging force of the tension coil spring 71, the lid opener lever 52 rotates clockwise as viewed in FIG. 2, which, in turn, causes the end 42B of the wire 42 to move in the direction of arrow C of FIG. 2.

The operation of this embodiment will now be described.

When the occupant pulls up the handle 82 of the lid opener lever 52 against the urging force of the tension coil spring 71 at the time of refueling, the end 42B of the wire 42 moves in the direction of arrow C in FIG. 2. Consequently, the other end 42A of the wire 42 moves in the direction of arrow A in FIG. 2, causing the lever 38 to rotate clockwise in FIG. 2. Accordingly, the end 22A of the shaft 22 is disengaged from the hook portion 20A of the retainer 20, thereby allowing the fuel lid 18 to open in the direction of arrow R in FIG. 4.

In addition, the pressing portion 66 of the lid opener lever 52 rotates clockwise as viewed in FIG. 2. As a result, the pushbutton 64A of the opener switch 64 secured to the base plate 54 moves in the direction of arrow B in FIG. 2, thereby closing the opener switch 64. Consequently, the solenoid valve 67 opens, which, in turn, causes the vent tube 69 to permit the interior of the fuel tank 10 to communicate with the canister 68, thereby allowing the fuel vapor to be adsorbed by the canister 68 thus preventing the fuel vapor from being discharged to the atmosphere.

Furthermore, the opener switch 64 and the lid opener lever 52 are separately mounted on the base plate 54. Accordingly, when the base plate 54 is assembled, by adjusting the mounting position of the opener switch 64, the positioning of the opener switch 64 and the lid opener lever 52 can be effected so that the opening and closing of the opener switch 64 can be controlled positively.

Hence, it is possible to improve the operating efficiency in adjusting the positions of the lid opener lever 52 and the opener switch 64.

By virtue of the above-described arrangement, this embodiment offers an outstanding advantage in that the operating efficiency in making positional adjustment of the lid opener lever and the opener switch can be improved.

It will be apparent to those skilled in the art that various modifications and variations can be made in the apparatus of the present invention without departing. From the spirit or scope of the invention, for example, instead of the opener switch being secured to the bracket and the pressing portion disposed on the lid opener lever an arrangement may be alternatively provided such that, conversely, the opener switch is secured to the lid opener lever and the pressing portion is disposed on the bracket. Thus, it is intended that the present invention cover the modifications and variations of this invention provided they come with in the scope of the present Claims and their equivalents.

What is claimed is:

1. An apparatus for preventing discharge of fuel vapor, comprising:
   a fuel tank;
   adsorbing means for adsorbing fuel vapor;

communicating means for communication between said adsorbing means and said fuel tank;

control means for opening a fuel lid through remote control, said control means including mounting means having a base plate for mounting said control means in a vehicle compartment remote from said fuel tank, said control means having a lever with a handle portion pivotably mounted on said mounting means;

switching means secured to said control means responsive to the operation of said control means for opening said fuel lid;

actuating means disposed on one of said lever and said mounting means for actuating said switching means upon operation of the handle portion of said lever; and valve means for closing said communicating means upon the closing of said fuel lid and for opening said communicating means in interlocking relation with the operation of said switching means.

2. An apparatus for preventing discharge of fuel vapor according to claim 1, wherein said control means includes a lever movably mounted to said base plate, said switching means being mounted to the base plate and having responsive to the moment of the lever.

3. An apparatus for preventing discharge of fuel vapor according to claim 1, further comprising urging means for constantly urging said lever in a direction, for opening said switching means.

4. An apparatus for preventing discharge of fuel vapor according to claim 3, wherein said mounting means includes a stopper for limiting the rotation of said lever in the direction for opening said switching means.

5. An apparatus for preventing discharge of fuel vapor according to claim 1, further comprising lid locking means for locking said fuel lid in a closed state and for unlocking said lid to an open state, and a wire connecting said control means to said lid locking means.

6. An apparatus for preventing discharge of fuel vapor according, to claim 1, wherein said mounting means includes means for adjusting the position of said switching means.

7. An apparatus for preventing discharge of fuel vapor comprising:

a fuel tank;

adsorbing means for adsorbing fuel vapor;

communicating means for communication between said adsorbing means and said fuel tank;

control means for opening a fuel lid through remote control, said control means including mounting means having a base plate for mounting said control means in a vehicle compartment remote from said fuel tank, said mounting means including a member having a circular hole and an elongated arcuate slot defining a portion of a circle with said circular hole as a center;

switching means secured to said control means responsive to the operation of said control means for opening said fuel lid, said switching means having a cylindrical projection inserted into said circular hole, a threaded hole spaced from said projection, a screw extending through said elongated slot and threadably engaging said threaded hole for securing said switching means to said mounting means; and valve means for closing said communicating means upon the closing of said fuel lid and for opening said communicating means in interlocking relation with the operation of said switching means.

8. An apparatus for preventing discharge of fuel vapor comprising:

a fuel tank;

adsorbing means for adsorbing fuel vapor;

communicating means for communication between said adsorbing means and said fuel tank;

control means for opening a fuel lid through remote control, said control means including mounting means having a base plate for mounting said control means in a vehicle compartment remote from said fuel tank, said switching means including a pushbutton operable when depressed to turn off said switching means and operable when released to turn on the switching means; and valve means for closing said communicating means upon the closing of said fuel lid and for opening said communicating means in interlocking relation with the operation of said switching means.

9. An apparatus for preventing discharge of fuel vapor, comprising:

a fuel tank;

a charcoal canister for adsorbing fuel vapor;

a vent tube for communication between said charcoal canister and the fuel tank;

a bracket fixedly mounted in a vehicle compartment remote from the fuel tanks;

an lid opener lever having a handle portion, a pressing portion, and a connecting portion movably mounted to said bracket;

a switch having a pushbutton for turning the switch on and off said switch being secured to said bracket adjacent the pressing portion for being pressed by said pressing portion of said opener lever; and a solenoid valve operable to close said vent tube in response to the depression of said pushbutton and operable to open said vent tube in response to the release of said pushbutton.

10. An apparatus for preventing discharge of fuel vapor according to claim 9, further comprising a spring for urging the pressing portion of said opener lever in a direction to depress said pushbutton, and a stopper for limiting the rotation of said opener lever in the direction for depressing said pushbutton.

11. An apparatus for preventing discharge of fuel vapor according to claim 9, wherein said switch is operable to turn off upon depressing of said pushbutton and operable to turn on upon the release of said pushbutton.

12. An apparatus for preventing discharge of fuel vapor according to claim 9, further comprising lid locking means for locking said fuel lid in a closed state and unlocking said fuel lid to an open state, and a wire for connecting said connecting portion of said opener lever and said lid locking means.

13. An apparatus for preventing discharge of fuel vapor according to claim 9, wherein said bracket has a circular hole and an elongated arcuate slot defining a portion of a circle having said circular hole as a center, said switch having a cylindrical projection inserted into said circular hole, and a threaded hole, and a screw extending through said elongated slot and threadingly engaged in said threaded hole for securing said switch to said bracket.

* * * * *